A. McN. & M. A. WIER.
Pneumatic Telegraph.
No. 91,694.
5 Sheets—Sheet 1.
Patented June 22, 1869.
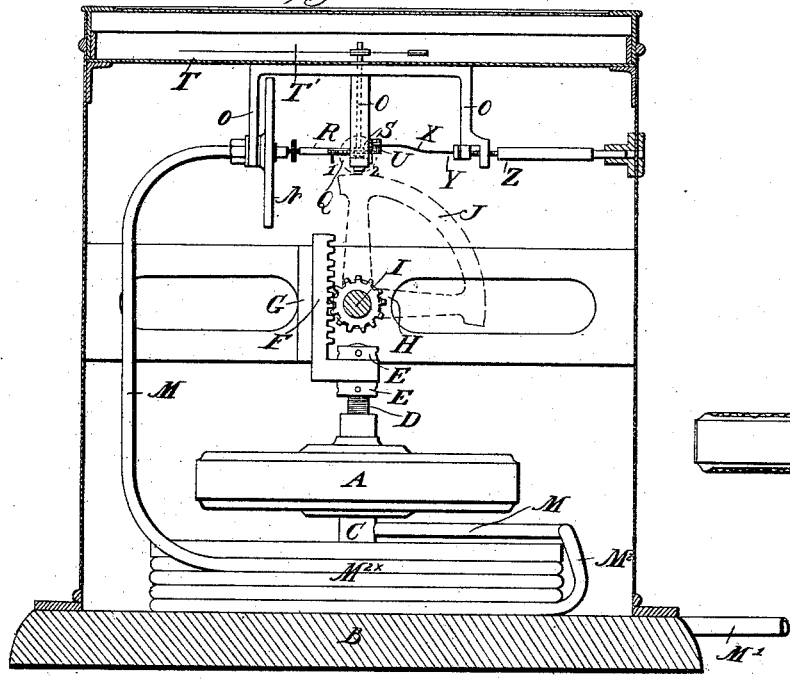
Fig. 1.
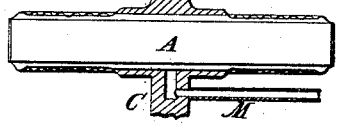
Fig. 5.
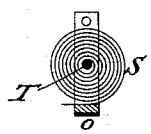
Fig. 5.ᵃ
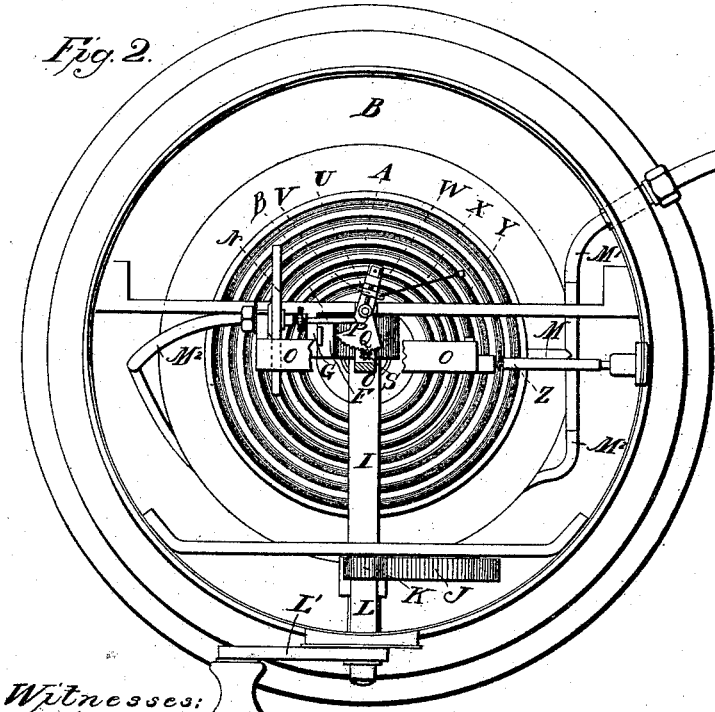
Fig. 2.
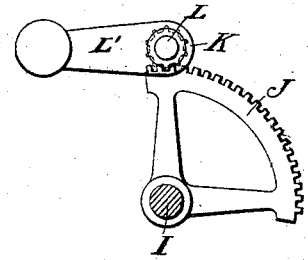
Fig. 6.
Witnesses:
B. D. Shugle,
W. H. Beck.
Inventors:
A. McN. Wier,
M. A. Wier.

A. McN. & M. A. WIER.
Pneumatic Telegraph.
No. 91,694.   Patented June 22, 1869.
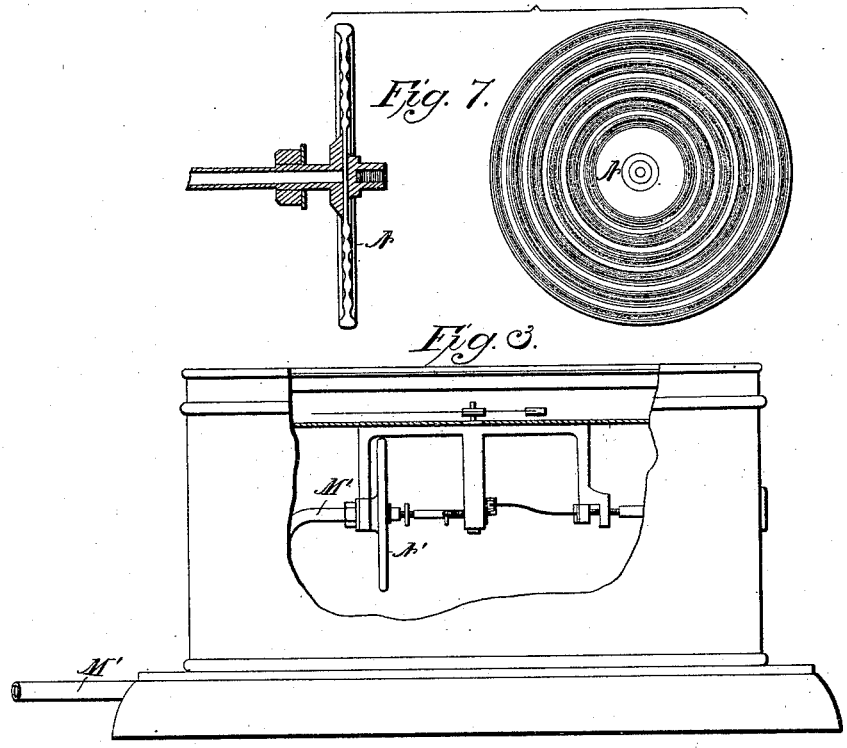
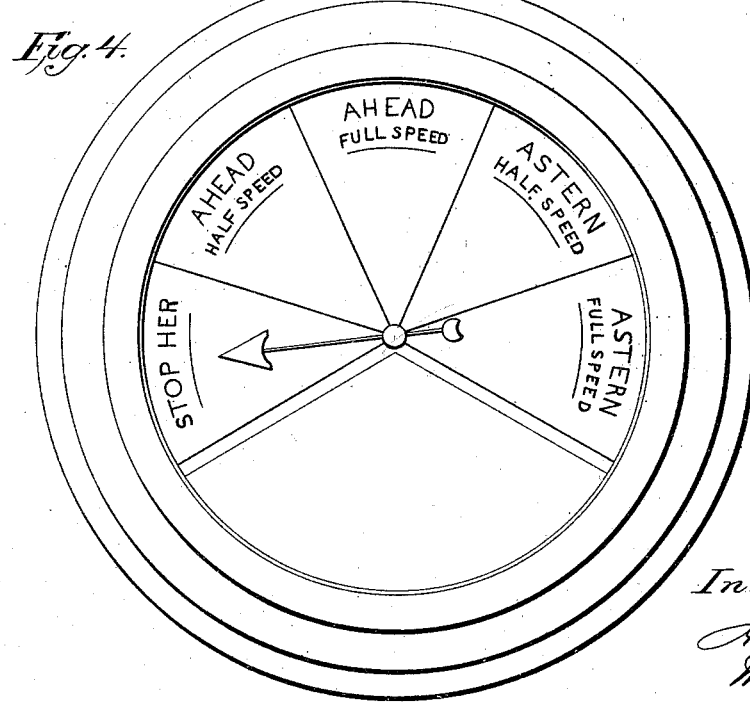

A. McN. & M. A. WIER.

Pneumatic Telegraph.

Patented June 22, 1869.

A. McN. & M. A. WIER.
Pneumatic Telegraph.
No. 91,694.
5 Sheets—Sheet 4.
Patented June 22, 1869.
Fig. 10.
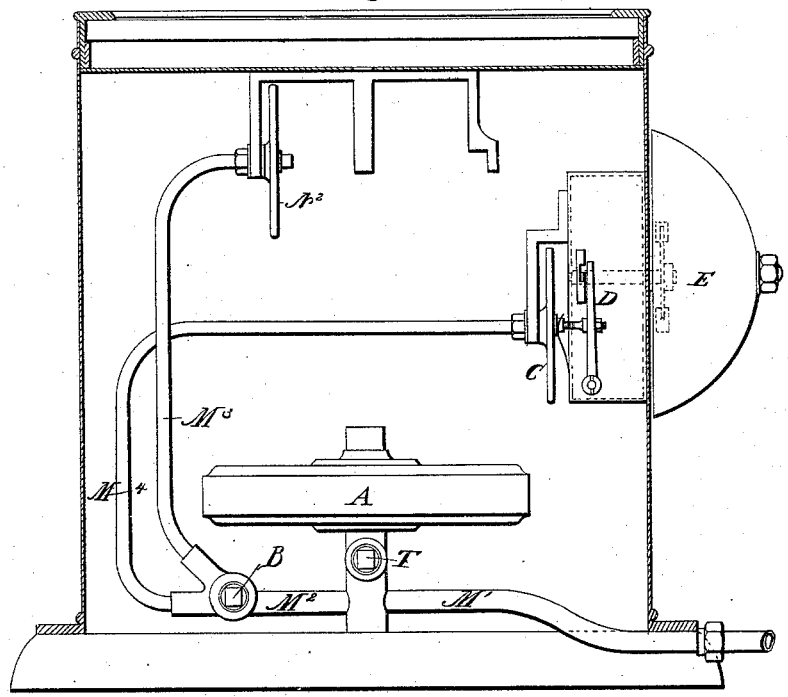
Fig. 12.
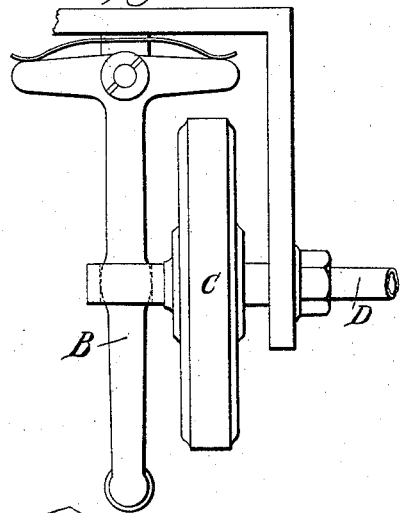
Fig. 14.
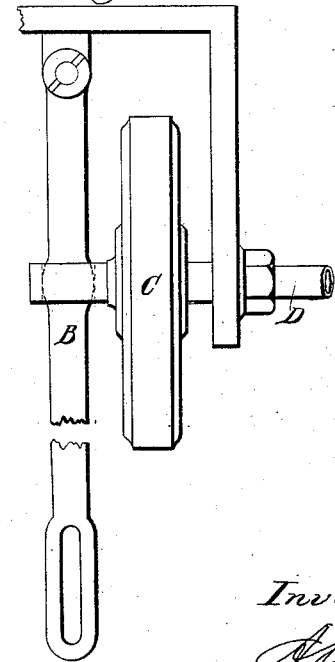
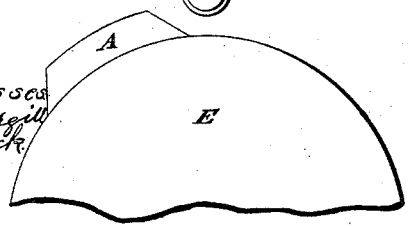
Witnesses
Inventors:

A. McN. & M. A. WIER.
Pneumatic Telegraph.
No. 91,694.
5 Sheets—Sheet 5.
Patented June 22, 1869.
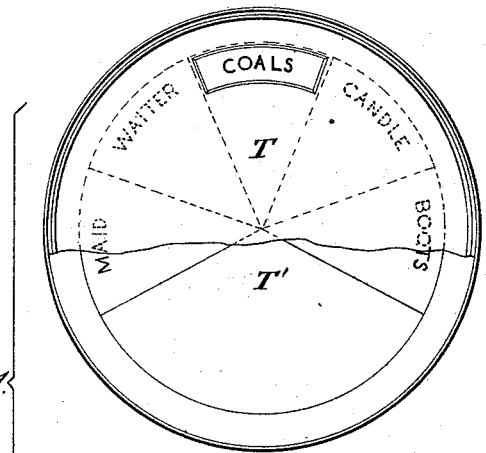
Fig. 11.
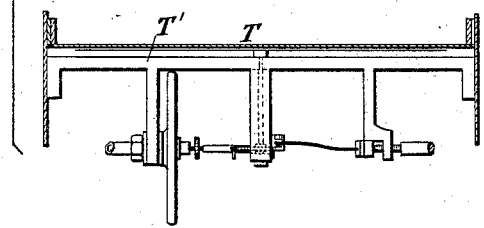
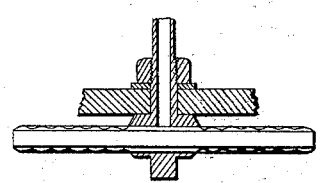
Fig. 13.
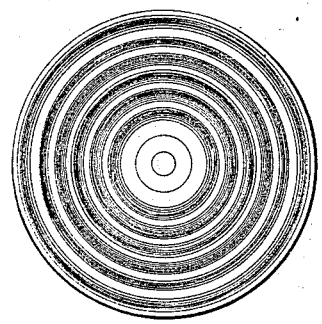
Witnesses:
B. D. Lothyzill.
W. K. Beck.
Inventors:
A. McN.
M. A. Wier.

United States Patent Office.

ARTHUR McNUTT WIER AND MARSHALL ARTHUR WIER, OF ELM LODGE, NEWTON ROAD, BAYSWATER, GREAT BRITAIN.

Letters Patent No. 91,694, dated June 22, 1869; patented in England, August 29, 1867.

IMPROVEMENT IN PNEUMATIC TELEGRAPHS.

The Schedule referred to in these Letters Patent and making part of the same.

*To all whom it may concern:*

Be it known that we, ARTHUR McNUTT WIER and MARSHALL ARTHUR WIER, both of Elm Lodge, Newton Road, Bayswater, in the county of Middlesex, and Kingdom of Great Britain, have invented certain Improvements in Signalling and Indicating-Apparatus; and we do hereby declare that the following is a full and exact description thereof, reference being had to the accompanying drawings, and to the letters of reference marked thereon.

Our invention of improvements in signalling and indicating-apparatus relates to that class of signalling-apparatus known as pneumatic, in which an index-pointer, or dial is operated by causing a column of air, under slight compression, to act upon a flexible diaphragm, the deflections or motions of which are communicated, by means of any convenient and suitable gearing, to the dial-index or pointer, whereby the signals are indicated.

Instruments constructed on the principle of the aneroid barometer have been heretofore tried, but have not been successful, as they were delicate in construction, and liable to be deranged.

Our improvement, therefore, has for its object to dispense with the delicate mechanism heretofore employed to give motion to the index, pointer, dial, or shutter.

This we effect by making the air-chamber so as to obtain greater elasticity in its flexible sides, and are thus enabled to apply simpler and more reliable mechanism for the purpose of transmitting motion from it to the pointer.

We also employ a close metallic vessel or chamber, made with thin collapsible sides, similar to the small air-vessel above referred to, but usually of much larger dimensions, instead of India-rubber balls, or other similar contrivances for the purpose of compressing the column of air to give the required signals.

It will now be understood that when the larger air-vessel or chamber at one end of the apparatus is collapsed, by pushing in one of the sides by means of any suitable mechanism, the smaller air-vessel or chamber at the opposite end will be expanded, and made to act on the index, pointer, or dial by the mechanism with which it is connected, and thus cause it to make a visible signal.

Instead of an index or pointer, a revolving dial-plate, in connection with the collapsible-sided metallic air-vessel or chamber above described, may be employed. On this revolving dial-plate are marked the orders or signals it is desired to transmit, and above it is placed a fixed plate, in which an opening is made, through which the orders or signals on the movable dial-plate below may be seen.

We connect the communicator of a signalling-apparatus, say on board ship, with the engine-shaft, for the purpose of indicating the number per minute and direction of revolutions of the engines. We place an eccentric or cam upon the shaft of the engine, which, in its revolutions, presses upon a lever attached to a collapsible-sided close metallic air-vessel or chamber, capable of being either expanded or compressed, and which gives motion, either to the right or left, (according as it is expanded or compressed,) to an index, pointer, or shutter on the dial-plate of the communicator.

The same arrangement of apparatus may be applied to the rudder of a vessel, and will indicate, by the index or pointer on the dial-plate, whether the helm has gone to port or starboard, in accordance with the order given.

One method by which the first part of our invention may be carried into effect, is illustrated on sheets 1 and 2 of the accompanying drawings, which represent that kind of instrument which we employ for the purpose of transmitting signals in one direction from one place to another, as, for example, from the officer in charge of a ship, on the bridge, to the engineer in the engine-room, or for any similar purpose.

Figure 1 is a partial vertical section; and

Figure 2, a plan, with dial-plate removed, of the apparatus as arranged in the instrument for sending signals, and which we call the communicator.

Figure 3 is an elevation, with part of the casing removed; and

Figure 4 is a plan showing dial-plate and index of the instrument for receiving signals, and which we call the indicator.

Figure 8:
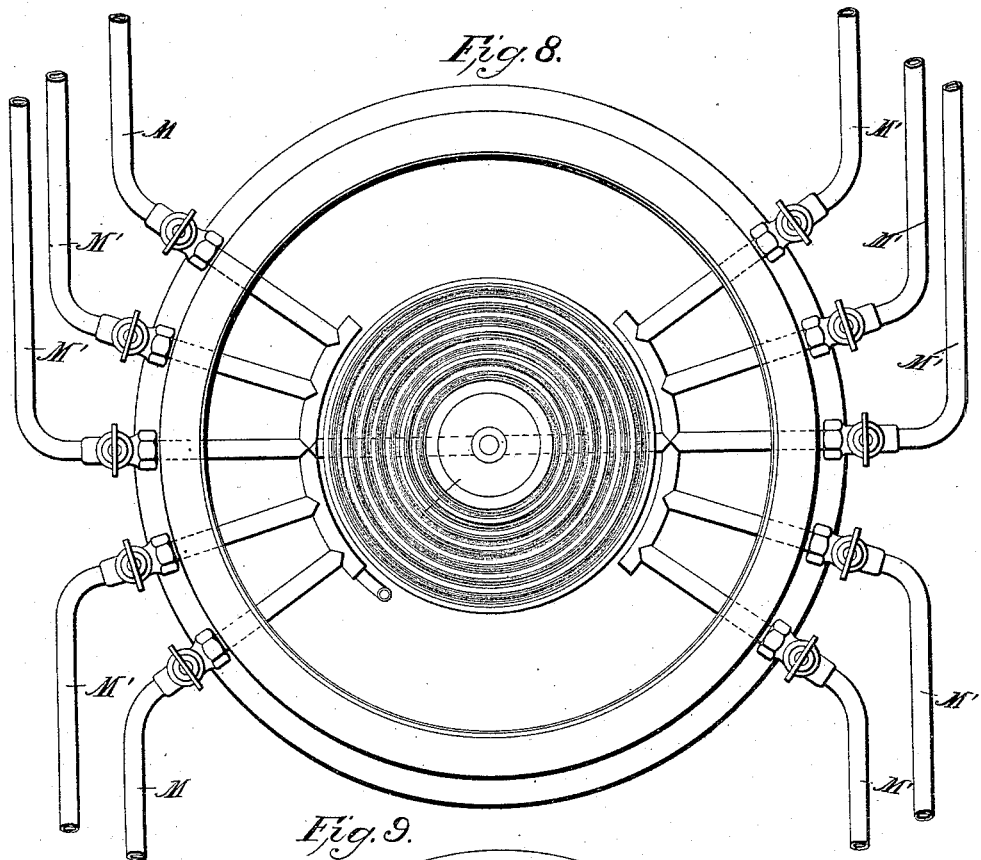

A is a close metallic air-vessel or chamber, made with thin collapsible sides, and by preference formed of German silver, and is shown in section at Figure 5, sheet 1.

The said close air-vessel A is fastened on one side to a board, B, by the stem C, projecting from its centre.

From the other side of the close air-vessel A, another stem projects, carrying a screw, D, to which is attached, by lock-nuts E E, a toothed rack, F, capable of a sliding motion on the guide G, attached to the frame-work of the instrument.

A pinion, H, fast upon the rocking-shaft I, gears into the rack F.

The rocking-shaft I is carried in bearings in the frame-work and casing of the instrument, and has fixed to it, near one end, a segmental rack, J, (see also Figure 6,) which receives motion from a second pinion, K, fast on a second short shaft, L, provided with a cranked handle, L', outside the casing of the instrument, by moving which the close air-vessel A will be expanded or contracted at will, by means of the pinions and racks.

The stem C, by which the close air-vessel A is attached to the board, has a passage formed in it, which communicates with the interior of the close air-vessel.

A pipe, M, forms a continuation of this passage. (See fig. 5.)

One branch, M¹, of said pipe M communicates by a tube with the indicator at the distant station, to be hereafter described.

The other branch, M², of the pipe communicates with a second and smaller close air-vessel, N, fixed to the frame O. This smaller close air-vessel we call the index air-vessel. It is shown in section and side elevation at Figure 7, sheet 2, to a scale double that of the other figures.

On a rocking-shaft, P, working on centres in the frame, is fixed a small segmental toothed rack, Q, which receives motion from a rod, R, connected to it at one end by a pin, and at the other end secured by an adjusting-screw to a stem projecting from the side of the index air-vessel opposite to that which receives the end of tube M².

A pinion, S, gears with segment-rack Q. The axis of said pinion passes through its bearing and the dial-plate T, and carries an index or pointer, T', outside the said dial-plate.

The segment-rack Q has an arm, U, projecting on the other side of the rocking shaft, which carries a sliding-piece, V, adjustable by a screw, W, as shown.

A slight connecting-rod, X, is pinned to sliding-piece V at one end, and at the other end is acted on by a steel spring, Y, which is adjustable, as regards its tension, by the screw Z, the purpose of said spring Y being to return the index to zero after the transmission of the signal.

Pins 1, 2, in the segment-rack Q, come to rest against the frame, so as to prevent too much motion in either direction.

The indicator, represented in figs. 3 and 4, is provided with an index air-vessel, N¹, similar to that above described, to which is connected the end of the tube M¹ leading from the communicator.

This index air-vessel N¹ acts, by mechanism similar to that above described for the index air-vessel of the communicator, upon the index or pointer of indicator.

It will now be readily understood, that on turning the handle L', so as to depress the rack, F, the side of the close vessel A will be pressed inwards, the air therein will be slightly compressed, and consequently that contained in the tubes M¹ and M², the index air-vessel N of the communicator, and N¹ of the indicator. The two latter will therefore expand in equal degree, and each will move, by the mechanism described, its index or pointer to the desired position over the corresponding dial-plate.

The object of applying the small air-vessel N to the communicator, is to secure isochronism or unison in the motions of the two indices, so that both may at all times point to similar signals on the two opposite dial-plates, which are precisely similar to each other.

In order to secure still greater certainty of unison in the motion of the indices, it is desirable that the length of the tube M² in the communicator, extending from the larger air-vessel, A, to the smaller, N, should be about equal to that of the tube M¹, extending to the indicator. It is then convenient to arrange it in the form of a coil, as shown at M²ˣ; or, instead of a coil of tubing, a spiral spring may be applied to the index-spindle, in such a manner as to offer a constant resistance equivalent to that of the tube leading to the indicator. This arrangement is shown in Figure 5ª, where T is the index-spindle, and S, the spiral spring, attached to it at one end, and at the other to the framing O.

Figure 9:
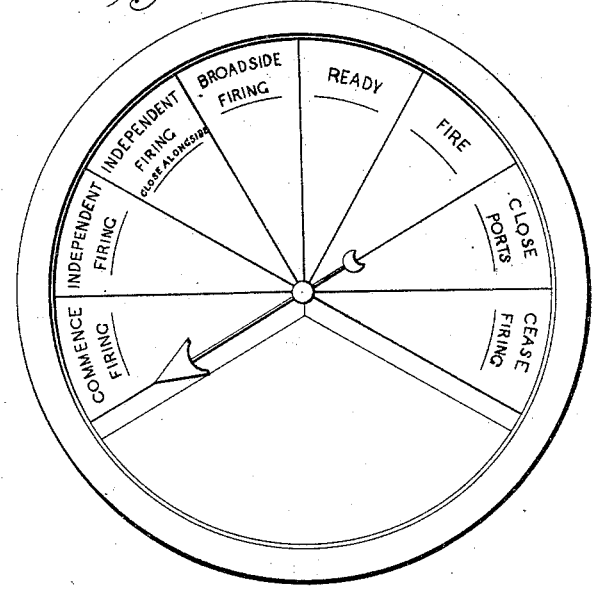

Figures 8 and 9, sheet 3, represent a modification of the first part of our invention, which renders it applicable to the purpose of signalling on board war-ships, from the officer in charge, stationed in the pilot-house, or other part of the ship, to the men engaged in working the guns, so as to enable him to transmit the necessary orders as to their working, either to the starboard or port side, and to any number of indicators on either or both sides.

The communicator and indicator-instruments employed are precisely similar to those above described; but the tubes M¹, leading from the large air-chamber, A, in the communicator to the various indicators, are arranged so that each such tube and indicator can be shut off from the communicator by means of the taps shown in each; or the whole of the tubes and indicators can be shut off at one side, leaving those at the other side in action; or any number of tubes and indicators may be shut off on both sides, leaving the remainder in action, at the will of the operator.

Fig. 9 shows the dial-plate for the communicator and indicator, as applied to the above-mentioned purpose.

This modification is, of course, equally applicable to any other purpose in which it is desired to transmit signals from one place to several others.

The apparatus, as above described, and illustrated in sheets 1, 2, and 3, is applicable where it is desired to transmit signals in one direction only, whether it be for issuing orders on board ship, or for communicating from one point to another on land.

When it is desired to communicate in both directions with the modifications heretofore referred to, it will be necessary to have a communicator and an indicator at each station, with a separate air-tube connecting the communicator at each station with the indicator at the other.

In order to obviate this inconvenience, we prefer to adopt the modification shown on sheet 4, Figure 10, in which it will be seen that a communicator only is employed at each end of the line of telegraph or signalling-distance, one air-tube being used to connect them together, such communicator serving, in turn, as communicator or indicator, according as it is used for sending or receiving a message or signal.

The figure represents the communicator arranged according to this modification, and, further, shows how a bell or other warning-instrument may be caused to sound, to draw the attention of the person in attendance.

A is a collapsible, close air-vessel, similar to that before described, the side of which is acted upon by similar mechanism.

The neck of the air-vessel is fitted with a tap, T, which can be opened or shut from the outside of the apparatus.

The branch M¹ leads to the communicator at the other station, (and which communicator is, in all respects, similar to the one under description.)

The branch M² is fitted with a two-way tap, B, which opens and closes communication between the branch-pipes M³ M⁴ and the branch M², alternately, as required.

The branch-pipe M³ leads to a small index air-vessel, N², in connection with the index of the instrument, and the branch-pipe M⁴ leads to another or secondary air-vessel, C, of similar construction to N².

A direct thrust from the said air-vessel C releases the trigger D, supporting the clapper of a bell, E, the sound of which will call attention.

The clapper of the bell is worked by a simple clockwork arrangement, as is usually employed in telegraphic instruments.

This method of releasing the clapper of an alarm-bell is also applicable to the other modifications of apparatus herein described.

It will now be understood, that when the communicator is in its normal condition, and out of action, the tap T is closed, shutting off the passage from the air-vessel, and the tap B stands so as to open communication between pipe M⁴ and the tube M¹, leading from the distant instrument, in which position the secondary air-vessel C can be acted on by the distant instrument, to release the alarm-bell.

When the operator requires to receive a signal, he moves tap B, so as to shut off air-vessel C from pipe M², and opens pipe M³ to M². He will then be able to read off the signal or telegram indicated on the dial by the index put in motion by the index air-chamber N².

When the operator requires to send a message or signal to distant station, he opens tap T, in neck of large air-vessel A, keeping open, by tap B, the passage between pipes M² and M³. Then, on pressing inward the side of air-vessel A, the index of the communicator may be moved so as to point to the desired signal, that in the distant instrument moving in unison with it, and pointing to the corresponding signal on its dial-plate.

In this way, by having the dial-plates marked with the letters of the alphabet, or other conventional signs, a conversation may be carried on between two distant places.

Figure 11, sheet 5, illustrates a method by which a revolving dial-plate, in connection with the collapsible-sided metallic air-vessel, may be used, instead of an index or pointer.

The upper diagram shows the fixed dial-plate T, with an opening therein, through which the signal marked on the revolving dial-plate, T', beneath is visible.

The lower diagram shows the revolving dial-plate mounted on the index-spindle, in the same manner as the index or pointer, and a similar air-vessel or other mechanism to give motion to it.

When the revolving dial-plate is large, and its momentum consequently considerable, it will be preferable to make the zero-space thereon in the middle of that part of its circumference on which the signals are marked, so that, in order to bring any desired signal under the opening, the angular movement of the dial from zero may be the least possible. In this case, the index air-vessel will be constructed as shown in Figure 13, sheet 5, so as to allow of both contraction and expansion.

Figure 12, sheet 4, illustrates the apparatus employed to connect the communicator with the engine-shaft, in order to denote the number of revolutions per minute thereof.

A cam or eccentric, A, is fixed to the shaft E, and, by its revolution therewith, acts upon a lever, B, which operates upon a collapsible-sided, close air-vessel, C, to which a tube, D, is connected, and carried to a communicating or indicating-apparatus, similar to that first described, fixed in any desired position, but the index air-vessel of which is constructed as shown in fig. 13, sheet 5, so as to allow of both expansion and contraction.

At every revolution of the shaft, the close vessel C is acted on by the lever B, and the pointer of the indicator is caused to move once for each revolution of the shaft, so that the number of such revolutions per minute can easily be determined, by ascertaining the number of movements of the pointer in a given time, by means of a time-piece.

The cam or eccentric A causes the lever to expand the close vessel when turning in one direction, and to contract it when turning in the opposite direction, thus either exhausting or compressing the air, and so causing the pointer to move to the right or left of the zero-point, in accordance with that direction, and by that means indicating whether the vessel is going ahead or astern.

Figure 14, sheet 4, shows a similar method of applying the last-mentioned improvement to steering-apparatus, in order that, when the rudder is moved in either direction, its position may be indicated, at a distance, to the captain, or other person in charge of the vessel.

B is a lever, so connected to the rudder as to move in accordance with it.

C is a collapsible-sided, close air-vessel, the side of which is drawn out or pressed in as the lever B is moved to the right or left of a centre line.

An air-tube, D, connects the close vessel C with the indicator at a distance, the index or pointer of which moves to the right or left of the zero-point, according as the close vessel is expanded or contracted, in a similar manner to that last described for indicating the direction of revolution of the engines.

*Claim.*

Having now described the nature of our said invention, and the manner in which the same is to be performed, we would have it understood that what we claim as our invention, is—

The application and arrangement of the air-chambers, in combination with the racks, pinions, and other mechanical parts, as described and illustrated, whereby the expansive and contractive action of the said air-chambers is made to impart motion to an index or dial, either to the right or left, as desired.

In testimony whereof, we have signed our names hereto, in the presence of two subscribing witnesses.

A. M. WIER.
M. A. WIER.

Witnesses:
   B. D. FOTHERGILL,
   W. H. BECK.